United States Patent
Spencer et al.

(10) Patent No.: US 10,406,897 B2
(45) Date of Patent: Sep. 10, 2019

(54) HARD ROLLUP TONNEAU COVER WITH FLEXIBLE HOLD DOWN

(71) Applicant: TruXedo, Inc., Yankton, SD (US)

(72) Inventors: Michael R. Spencer, Hubbard, NE (US); Tim Nelson, Yankton, SD (US)

(73) Assignee: TRUXEDO, INC., Yankton, SD (US)

( * ) Notice: Subject to any disclaimer, the term of this patent is extended or adjusted under 35 U.S.C. 154(b) by 43 days.

(21) Appl. No.: 15/623,164

(22) Filed: Jun. 14, 2017

(65) Prior Publication Data

US 2018/0361838 A1 Dec. 20, 2018

(51) Int. Cl.
| | | |
|---|---|---|
| *B60P 7/02* | (2006.01) | |
| *B60J 7/14* | (2006.01) | |
| *B60J 7/19* | (2006.01) | |

(52) U.S. Cl.
CPC .............. *B60J 7/141* (2013.01); *B60J 7/198* (2013.01)

(58) Field of Classification Search
CPC .................................. B60J 7/141; B60J 7/198
See application file for complete search history.

(56) References Cited

U.S. PATENT DOCUMENTS

| | | |
|---|---|---|
| 2,771,319 A | 11/1956 | Renquist |
| 4,210,361 A | 7/1980 | Marvin et al. |
| 4,216,990 A | 8/1980 | Musgrove et al. |
| 4,313,636 A | 2/1982 | Deeds |
| 4,784,427 A | 11/1988 | Burgess |
| 4,795,206 A | 1/1989 | Adams |
| 4,807,921 A | 2/1989 | Champie, III |
| 4,889,381 A | 12/1989 | Tamblyn et al. |
| 4,946,217 A | 8/1990 | Steffens et al. |
| 5,040,843 A | 8/1991 | Russell et al. |
| 5,074,188 A | 12/1991 | Harris |
| 5,251,950 A | 10/1993 | Bernardo |
| 5,253,694 A | 10/1993 | Bernardo |
| 5,330,246 A | 7/1994 | Bernardo |
| 5,350,213 A | 9/1994 | Bernardo |
| 5,427,428 A | 6/1995 | Ericson et al. |
| 5,636,893 A | 6/1997 | Wheatley et al. |
| 5,795,011 A | 8/1998 | Flentge |

(Continued)

OTHER PUBLICATIONS

RollBak Aluminum Retractable Tonneau Covers brochure (Nov. 2003).

(Continued)

*Primary Examiner* — Lori L Lyjak
(74) *Attorney, Agent, or Firm* — Harness, Dickey & Pierce, P.L.C.

(57) ABSTRACT

A tonneau cover system for a vehicle having a cargo box. A first side rail and a second side rail are coupleable to opposite lateral sides of the cargo box. The first side rail and the second side rail include a side rail retention member. A tonneau cover is configured to cover the cargo box and extend between the first side rail and the second side rail. First and second sides of the tonneau cover include at least one tonneau cover retention member. The side rail retention members cooperate with the tonneau cover retention members to maintain the first side and the second side of the tonneau cover in cooperation with the first side rail and the second side rail respectively, and thereby resist lifting of the first side from the first side rail and the second side from the second side rail.

17 Claims, 5 Drawing Sheets

(56) References Cited

U.S. PATENT DOCUMENTS

| | | |
|---|---|---|
| D403,292 S | 12/1998 | Bogard |
| 5,857,729 A | 1/1999 | Bogard |
| 6,030,021 A | 2/2000 | Ronai |
| 6,076,881 A | 6/2000 | Tucker |
| 6,082,806 A | 7/2000 | Bogard |
| 6,113,176 A | 9/2000 | Bernardo |
| 6,126,225 A | 10/2000 | Griffin |
| 6,126,226 A | 10/2000 | Wheatley |
| 6,217,102 B1 | 4/2001 | Lathers |
| 6,340,194 B1 | 1/2002 | Muirhead et al. |
| 6,422,635 B1 | 7/2002 | Steffens et al. |
| 6,454,337 B2 | 9/2002 | Steffens et al. |
| 6,565,141 B1 | 5/2003 | Steffens et al. |
| 6,827,389 B1 | 12/2004 | Pandorf |
| 6,899,372 B1 | 5/2005 | Keller |
| 7,021,693 B2 | 4/2006 | Keller |
| 7,066,523 B2 | 6/2006 | Verduci et al. |
| 7,445,264 B2 | 11/2008 | Spencer et al. |
| 7,604,282 B2 | 10/2009 | Spencer et al. |
| 7,828,361 B1 | 11/2010 | Spencer |
| 8,182,021 B2 | 5/2012 | Maimin et al. |
| 8,939,494 B2 | 1/2015 | Maimin et al. |
| 9,604,524 B1 * | 3/2017 | Carlson |
| 2003/0197394 A1 | 10/2003 | Dimmer |
| 2004/0245799 A1 | 12/2004 | Rusu |
| 2009/0243331 A1 | 10/2009 | Spencer et al. |
| 2011/0164953 A1 * | 7/2011 | Williams ............... B65G 67/20 414/572 |
| 2014/0042754 A1 * | 2/2014 | Spencer .................. B60J 7/185 292/7 |
| 2016/0059682 A1 * | 3/2016 | Rusher .................... B60P 7/02 296/100.09 |
| 2017/0066311 A1 * | 3/2017 | Facchinello ............ B60J 7/198 |
| 2017/0080786 A1 * | 3/2017 | Carlson .................. B60J 7/06 |
| 2017/0210214 A1 * | 7/2017 | Weltikol ................. B60J 7/141 |

OTHER PUBLICATIONS

RollBak install instructions (Jan. 2005).
RollBak G2 brochure (Oct. 2007).
RollBak brochure (Dec. 2007).

\* cited by examiner

HARD ROLLUP TONNEAU COVER WITH FLEXIBLE HOLD DOWN

FIELD

The present disclosure relates to tonneau covers, such as tonneau covers for covering a vehicle cargo box.

BACKGROUND

This section provides background information related to the present disclosure, which is not necessarily prior art.

Although current cargo box tonneau covers are suitable for their intended use, they are subject to improvement. For example, a tonneau cover that is more resistant to being lifted from the sides when the tonneau cover is closed would be desirable. Such a tonneau cover would advantageously secure the cargo box and make it more difficult for an intruder to gain entry to the cargo box by lifting the sides of the tonneau cover. The tonneau covers according to the present teachings provide such advantages, as well as numerous others as one skilled in the art will appreciate.

SUMMARY

This section provides a general summary of the disclosure, and is not a comprehensive disclosure of its full scope or all of its features.

The present teachings provide for a tonneau cover system for a vehicle having a cargo box. A first side rail and a second side rail are coupleable to opposite lateral sides of the cargo box. The first side rail and the second side rail include a side rail retention member. A tonneau cover is configured to cover the cargo box and extend between the first side rail and the second side rail. First and second sides of the tonneau cover include at least one tonneau cover retention member. The side rail retention members cooperate with the tonneau cover retention members to maintain the first side and the second side of the tonneau cover in cooperation with the first side rail and the second side rail respectively, and thereby resist lifting of the first side from the first side rail and the second side from the second side rail.

Further areas of applicability will become apparent from the description provided herein. The description and specific examples in this summary are intended for purposes of illustration only and are not intended to limit the scope of the present disclosure.

DRAWINGS

The drawings described herein are for illustrative purposes only of select embodiments and not all possible implementations, and are not intended to limit the scope of the present disclosure.

Corresponding reference numerals indicate corresponding parts throughout the several views of the drawings.

DETAILED DESCRIPTION

Example embodiments will now be described more fully with reference to the accompanying drawings.

Figure 1A:
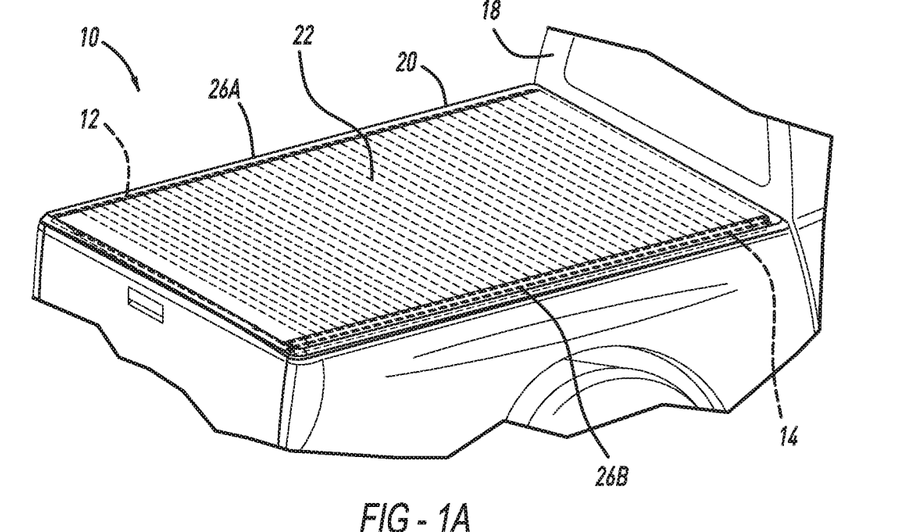
FIG. 1A illustrates a tonneau cover system according to the present teachings included with an exemplary vehicle, a tonneau cover of the system is illustrated in a closed position.

FIG. 1A illustrates a tonneau cover system according to the present teachings at reference numeral 10. The system 10 includes a first side rail 12 and a second side rail 14. The first and second side rails 12 and 14 are mounted in any suitable manner to a vehicle 18, and particularly to opposing sidewalls of a cargo box 20. The system 10 further includes a tonneau cover 22, which in the extended and closed position of FIG. 1 covers the cargo box 20, such as to secure and protect the contents thereof. The tonneau cover 22 is supported over the cargo box 20 by the first and second side rails 12 and 14. The tonneau cover 22 is positioned such that a first side 26A of the tonneau cover 22 is at the first side rail 12, and a second side 26B of the tonneau cover 22 is at the second side rail 14.

Figure 1B:
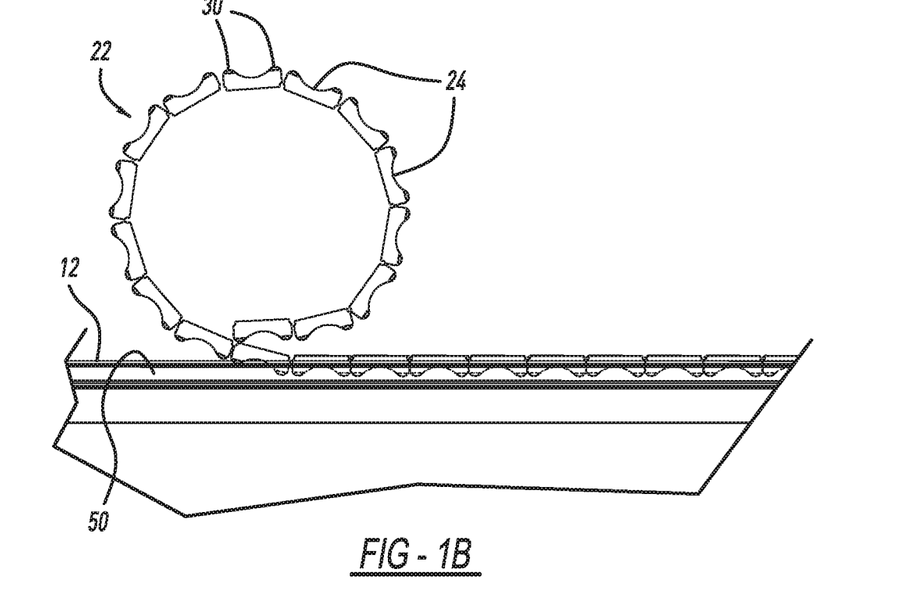
FIG. 1B is a side view of the system of FIG. 1A illustrating the tonneau cover rolled-up to a partially open position.
Figure 2:
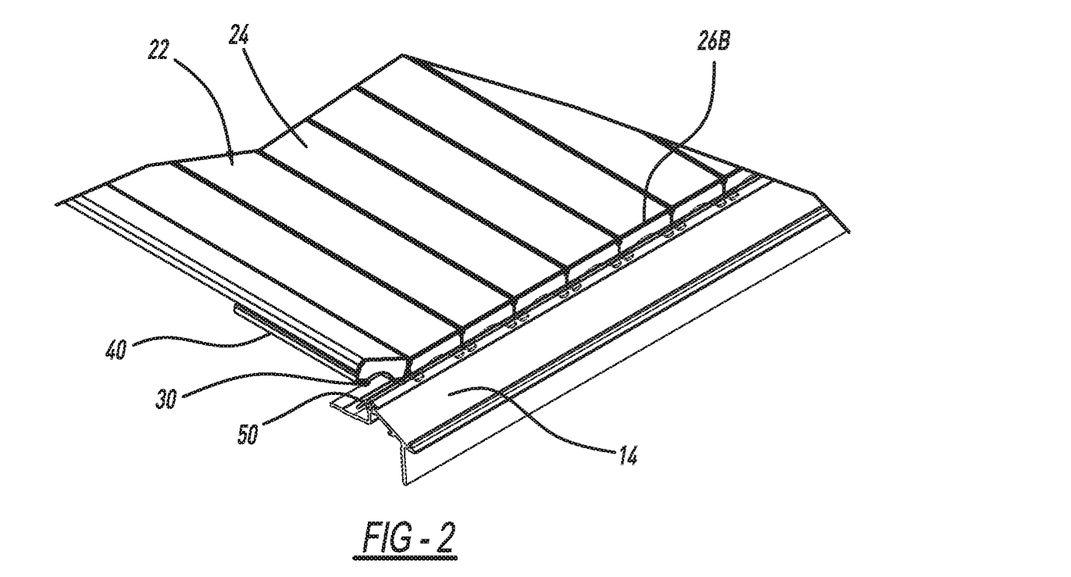
FIG. 2 is a perspective view of a portion of the tonneau cover and a side rail of the system of FIG. 1A, a slat of the tonneau cover is partially lifted from the side rail.

The tonneau cover 22 can be any suitable type of tonneau cover. For example, the tonneau cover 22 can include a plurality of slats 24, such as illustrated in FIG. 1B and FIG. 2. The slats 24 are coupled together in any suitable hinged manner, so as to allow the tonneau cover 22 to be moved or retracted from the closed position of FIG. 1A to an open position by rolling the tonneau cover 22 towards a front of the vehicle 18, as illustrated in FIG. 1B.

Although FIG. 1A illustrates the vehicle 18 as a pickup truck, the tonneau cover system 10 can be used with any suitable vehicle including a cargo box, such as any suitable passenger vehicle, military vehicle, construction vehicle, watercraft, aircraft, etc. The tonneau cover system 10 can also be used with any suitable non-vehicular application in order to secure contents of a storage area.

The tonneau cover 22 includes a plurality of tonneau cover retention members 30 at both the first side 26A and the second side 26B. The tonneau cover retention members 30 can be arranged in any suitable manner, and any suitable number of the tonneau cover retention members 30 can be provided. For example, each one of the plurality of slats 24 may include one or more tonneau cover retention members 30 at the first side 26A and the second side 26B of the tonneau cover 22. Alternatively, some of the slats 24 may include tonneau cover retention members 30 at the first side 26A, and not at the second side 26B, or vice versa such that one or more tonneau cover retention members 30 are at the second side 26B, but not at the first side 26A. Furthermore, not all of the slats 24 need include the tonneau cover retention members 30. For example, the tonneau cover retention members 30 may only be included with every other slat 24.

Each slat 24 may include any suitable number of the tonneau cover retention members 30. For example, each slat 24 may include two spaced apart tonneau cover retention members 30 at the first side 26A and at the second side 26B. Any other suitable combination of tonneau cover retention members 30 can be included. For example, the first side 26A and/or the second side 26B can include a single tonneau cover retention member 30 extending across the first/second side 26A/26B. Furthermore, each one of the first sides 26A and the second sides 26B of the slats 24 can themselves include any suitable number of tonneau cover retention members 30, such as 0, 1, 2, etc. tonneau cover retention members 30.

Each one of the tonneau cover retention members 30 can be any suitable retention member configured to cooperate with side rail retention members 50 described herein to maintain the first side 26A and the second side 26B of the tonneau cover 22 in cooperation with the first side rail 12 and the second side rail 14 to resist lifting of the tonneau cover 22 from the first side rail 12 and the second side rail 14, thereby preventing intruders from accessing contents of the cargo box 20. For example, the tonneau cover retention members 30 may be tabs extending from the slats 24.

Figure 6:
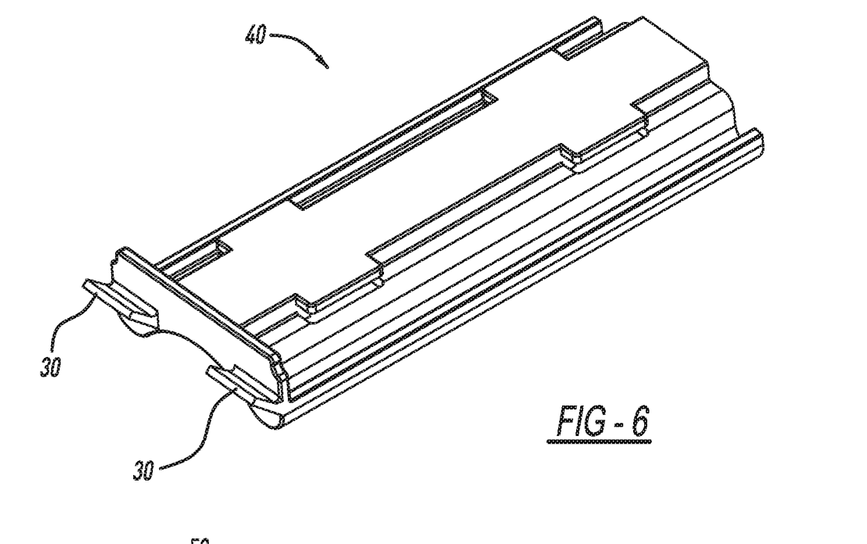
FIG. 6 is a perspective view of an exemplary tonneau cover end cap according to the present teachings including tonneau cover retention members.
Figure 8:
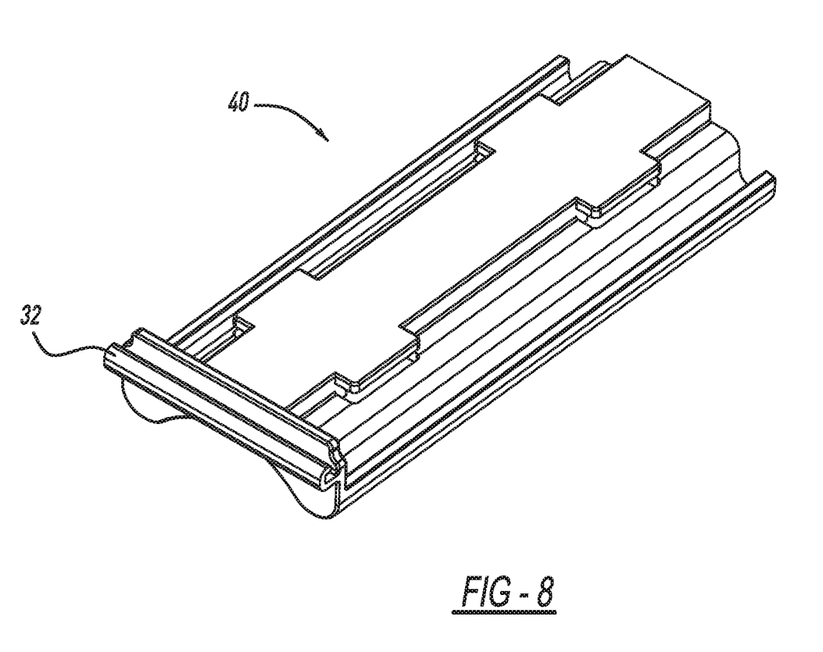
FIG. 8 is a perspective view of the end cap of FIG. 7.

The tonneau cover retention members 30 may be integral with the slats 24 themselves, or attached to the slats 24 in any suitable manner. For example, the tonneau cover system 10 may include a plurality of end caps 40, which can be coupled to the first and second sides 26A and 26B of the slats 24. FIGS. 6 and 8 illustrate exemplary caps 40 apart from the slats 24. The caps 40 can have any structure suitable for being coupled to the slats 24, and will be further described herein.

Figure 3:
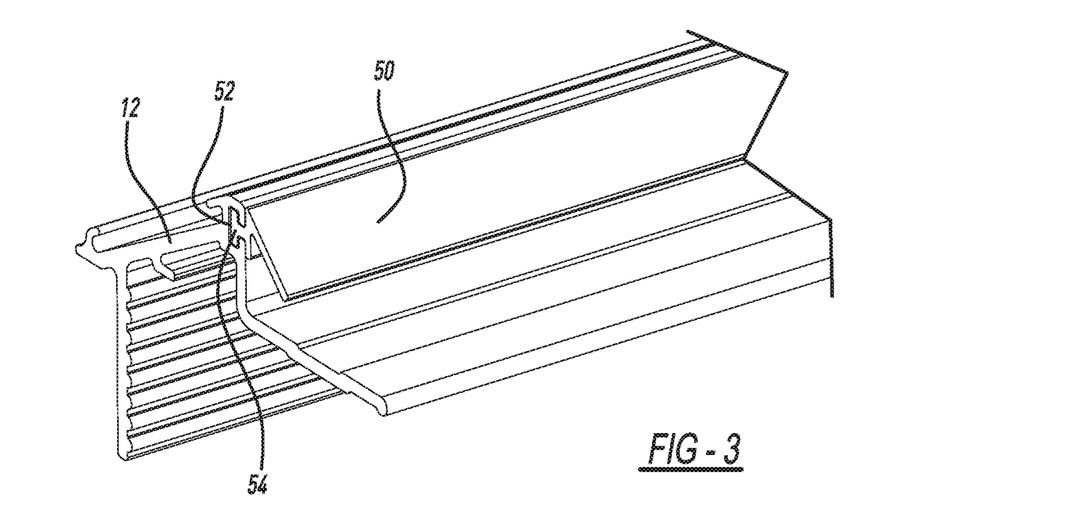
FIG. 3 is a perspective view of an exemplary side rail retention member according to the present teachings including a flexible tab.
Figure 4:
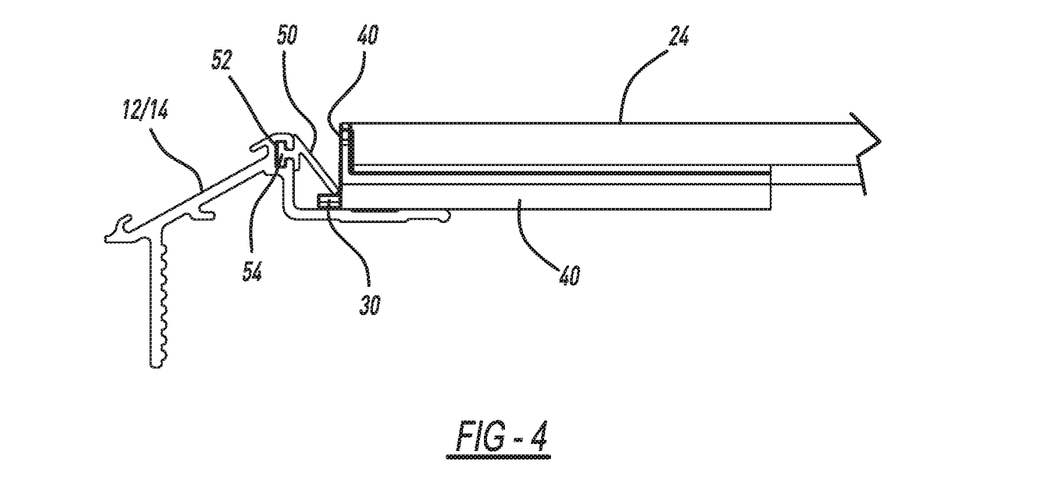
FIG. 4 illustrates cooperation between the side rail retention member of FIG. 3 and a tonneau cover retention member in accordance with the present teachings.

With reference to FIGS. 2-4, for example, the side rail retention members 50 may take the form of an elongated flap extending along each one of the first and second side rails 12 and 14. The side rail retention members 50 may be secured to the side rails 12 and 14 in any suitable manner. For example, the first and second side rails 12 and 14 may each define a channel 52, into which a flange 54, or any other suitable portion, of the side rail retention members 50 may be inserted. The side rail retention members 50 may extend along an entirety of, or a substantial entirety of, the first and second side rails 12 and 14. The side rail retention members 50 may extend continuously or discontinuously along the side rails 12 and 14. For example, the side rail retention members 50 may include a plurality of spaced apart flaps or tabs.

In the example of FIG. 4, the side rail retention members 50 are flexible flaps, and the tonneau cover retention members 30 are rigid tabs. The side rail retention members 50 cooperate with the tonneau cover retention members 30 to maintain the tonneau cover 22 in contact with the side rails 12 and 14, and this cooperation resists lifting of the tonneau cover 22 from the side rails 12 and 14. To move the tonneau cover 22 from the closed position of FIG. 1A to an open position (FIG. 1B illustrates a partially open position), the rearmost slat 24 of the cover 22 is lifted to disengage the tonneau cover retention members 30 from cooperation with the side rail retention members 50, and the tonneau cover 22 is then rolled towards the front of the vehicle 18. As the tonneau cover 22 is rolled open, the tonneau cover retention members 30 sequentially disengage from cooperation with the side rail retention members 50, resulting in a "peeling action," which requires relatively less force to disengage each one of the tonneau cover retention members 30 from cooperation with the side rail retention members 50 as compared to the amount of force that would be required to lift a plurality of the tonneau cover retention members 30 together from cooperation with the side rail retention members 50, as an intruder would attempt to do by lifting the first side 26A or the second side 26B of the tonneau cover 22.

Figure 5:
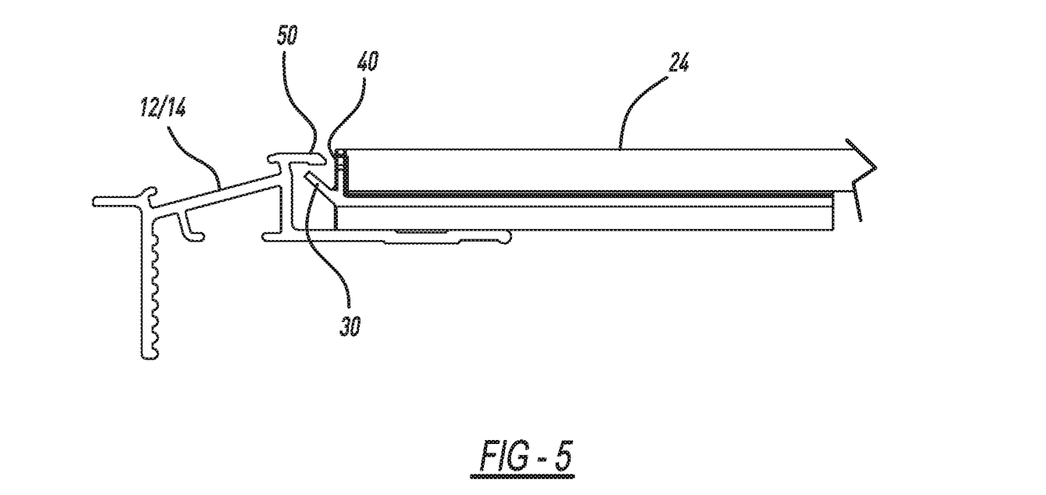
FIG. 5 illustrates is a side view of another side rail retention member according to the present teachings including a rigid tab, which is opposite to a flexible tonneau cover retention member according to the present teachings.

With reference to FIG. 5, the side rail retention members 50 can be provided as rigid flanges integral with the first and second side rails 12 and 14, and the tonneau cover retention members 30 can be flexible. The flexible tonneau cover retention members 30 of FIG. 5 are included with the cap 40, which is illustrated apart from the tonneau cover 22 in FIG. 6. Thus FIG. 5 illustrates the cap 40 of FIG. 6 in cooperation with one of the slats 24.

Figure 7:
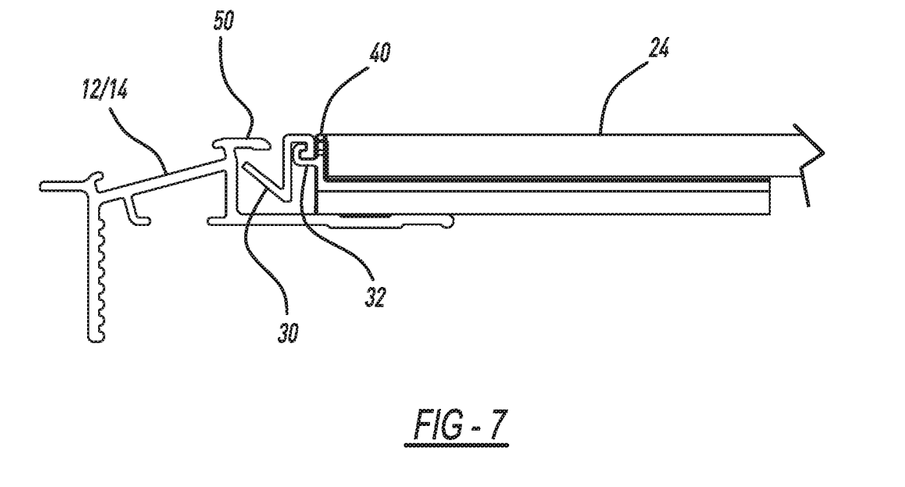
FIG. 7 is a side view of another tonneau cover end cap according to the present teachings with a tonneau cover retention member extending therefrom.

With reference to FIGS. 7 and 8, the tonneau cover retention members 30 need not be integral with the cap 40. Instead, the cap 40 can include a receptacle 32 or other coupling member, which may be rigid. The tonneau cover retention member 30 can be arranged as a separate piece configured to couple with the rigid receptacle 32, as illustrated in FIG. 7.

The present teachings thus advantageously provide for the tonneau cover system 10, which holds down the first side 26A and the second side 26B of the tonneau cover 22 at the first side rail 12 and the second side rail 14. The system 10 holds down the tonneau cover 22 through cooperation between the tonneau cover retention members 30 and the side rail retention members 50. Thus the system 10 according to the present teachings advantageously makes it more difficult for a perpetrator to lift the first side 26A and/or the second side 26B of the tonneau cover 22 to gain access to contents of the cargo box 20.

The foregoing description of the embodiments has been provided for purposes of illustration and description. It is not intended to be exhaustive or to limit the disclosure. Individual elements or features of a particular embodiment are generally not limited to that particular embodiment, but, where applicable, are interchangeable and can be used in a selected embodiment, even if not specifically shown or described. The same may also be varied in many ways. Such variations are not to be regarded as a departure from the disclosure, and all such modifications are intended to be included within the scope of the disclosure.

Example embodiments are provided so that this disclosure will be thorough, and will fully convey the scope to those who are skilled in the art. Numerous specific details are set forth such as examples of specific components, devices, and methods, to provide a thorough understanding of embodiments of the present disclosure. It will be apparent to those skilled in the art that specific details need not be employed, that example embodiments may be embodied in many different forms and that neither should be construed to limit the scope of the disclosure. In some example embodiments, well-known processes, well-known device structures, and well-known technologies are not described in detail.

The terminology used herein is for the purpose of describing particular example embodiments only and is not intended to be limiting. As used herein, the singular forms "a," "an," and "the" may be intended to include the plural forms as well, unless the context clearly indicates otherwise. The terms "comprises," "comprising," "including," and "having," are inclusive and therefore specify the presence of stated features, integers, steps, operations, elements, and/or components, but do not preclude the presence or addition of one or more other features, integers, steps, operations, elements, components, and/or groups thereof. The method steps, processes, and operations described herein are not to be construed as necessarily requiring their performance in the particular order discussed or illustrated, unless specifically identified as an order of performance. It is also to be understood that additional or alternative steps may be employed.

When an element or layer is referred to as being "on," "engaged to," "connected to," or "coupled to" another element or layer, it may be directly on, engaged, connected or coupled to the other element or layer, or intervening elements or layers may be present. In contrast, when an element is referred to as being "directly on," "directly engaged to," "directly connected to," or "directly coupled to" another element or layer, there may be no intervening elements or layers present. Other words used to describe the relationship between elements should be interpreted in a like fashion (e.g., "between" versus "directly between," "adjacent" versus "directly adjacent," etc.). As used herein, the term "and/or" includes any and all combinations of one or more of the associated listed items.

Although the terms first, second, third, etc. may be used herein to describe various elements, components, regions, layers and/or sections, these elements, components, regions, layers and/or sections should not be limited by these terms. These terms may be only used to distinguish one element, component, region, layer or section from another region, layer or section. Terms such as "first," "second," and other numerical terms when used herein do not imply a sequence or order unless clearly indicated by the context. Thus, a first element, component, region, layer or section discussed below could be termed a second element, component, region, layer or section without departing from the teachings of the example embodiments.

Spatially relative terms, such as "inner," "outer," "beneath," "below," "lower," "above," "upper," and the like, may be used herein for ease of description to describe one element or feature's relationship to another element(s) or feature(s) as illustrated in the figures. Spatially relative terms may be intended to encompass different orientations of the device in use or operation in addition to the orientation depicted in the figures. For example, if the device in the figures is turned over, elements described as "below" or "beneath" other elements or features would then be oriented "above" the other elements or features. Thus, the example term "below" can encompass both an orientation of above and below. The device may be otherwise oriented (rotated 90 degrees or at other orientations) and the spatially relative descriptors used herein interpreted accordingly.

What is claimed is:

1. A tonneau cover system for a vehicle having a cargo box, the tonneau cover system comprising:
   a first side rail and a second side rail coupleable to opposite lateral sides of the cargo box, each one of the first side rail and the second side rail including a side rail retention member; and
   a roll-up tonneau cover sized and shaped to cover the cargo box and extend between the first side rail and the second side rail, the roll-up tonneau cover includes a plurality of slats coupled together that roll-up to give the roll-up cover a circular shape when rolled from a closed position to an open position, the roll-up tonneau cover having a first side proximate to the first side rail and a second side proximate to the second side rail, the first side of the roll-up tonneau cover and the second side of the roll-up tonneau cover each include at least one tonneau cover retention member;
   wherein the side rail retention members cooperate with the roll-up tonneau cover retention members to maintain the first side and the second side of the roll-up tonneau cover in cooperation with the first side rail and the second side rail respectively, and thereby resist lifting of the first side from the first side rail and the second side from the second side rail; and
   wherein the side rail retention members include a flexible tab.

2. The tonneau cover system of claim 1, wherein at least one of the side rail retention members of the first side rail and the second side rail extend continuously along at least a portion of the first side rail or the second side rail respectively.

3. The tonneau cover system of claim 1, wherein at least one of the side rail retention members of the first side rail and the second side rail extend discontinuously along at least a portion of the first side rail or the second side rail respectively.

4. The tonneau cover system of claim 1, wherein the at least one tonneau cover retention member is included with a cap coupled to the tonneau cover.

5. The tonneau cover system of claim 1, wherein:
   the tonneau cover includes the plurality of slats coupled together, each one of the plurality of slats has a first end and a second end;
   one or more of the plurality of slats includes at least one of the tonneau cover retention members at the first end; and
   one or more of the plurality of slats includes at least one of the tonneau cover retention members at the second end.

6. The tonneau cover system of claim 1, wherein when the tonneau cover is in the closed position, the plurality of slats extend continuously along at least one of the first side and the second side of the tonneau cover.

7. The tonneau cover system of claim 1, wherein:
   the side rail retention member of the first side rail is seated within a channel defined by the first side rail; and
   the side rail retention member of the second side rail is seated within a channel defined by the second side rail.

8. The tonneau cover system of claim 1, wherein the tonneau cover retention members include a plurality of rigid projections, and the side rail retention members are flexible.

9. The tonneau cover system of claim 1, wherein:
   the tonneau cover includes the plurality of slats coupled together;
   each one of the plurality of slats includes a first end cap at a first end of the plurality of slats, and a second end cap at a second end of the plurality of slats; and
   the plurality of end caps include the tonneau cover retention members.

10. A tonneau cover system for a vehicle having a cargo box, the tonneau cover system comprising:
    a first side rail and a second side rail coupleable to opposite lateral sides of the cargo box, each one of the first side rail and the second side rail including a side rail retention member;
    a roll-up tonneau cover sized and shaped to cover the cargo box and extend between the first side rail and the second side rail, the roll-up tonneau cover including a plurality of slats with hinges therebetween that roll-up to give the roll-up cover a circular shape when rolled from a closed position to an open position, each one of the plurality of slats has a first side proximate to the first side rail and a second side proximate to the second side rail, the first side of at least one of the plurality of slats includes a first end cap and the second side of at least one of the plurality of slats includes a second end cap; and a tonneau cover retention member included with the first end cap and the second end cap.

11. The tonneau cover system of claim 10, wherein at least one of the side rail retention members includes a continuous tab.

12. The tonneau cover system of claim 10, wherein at least one of the side rail retention members includes a discontinuous tab.

13. The tonneau cover system of claim 10, wherein:
the tonneau cover retention members include projections extending from the first end cap and the second end cap; and
the projections are seated beneath the side rail retention members to maintain the first side and the second side of the tonneau cover in cooperation with the first side rail and the second side rail respectively, and thereby resist lifting of the first side from the first side rail and the second side from the second side rail.

14. The tonneau cover system of claim 10, wherein the tonneau cover retention members are arranged discontinuously along opposite sides of the tonneau cover.

15. The tonneau cover system of claim 10, wherein when the tonneau cover is closed the tonneau cover retention members extend continuously along opposite sides of the tonneau cover.

16. The tonneau cover system of claim 10, wherein one of:
the tonneau cover retention members are rigid, and the side rail retention members are flexible; and
the tonneau cover retention members are flexible, and the side rail retention members are rigid.

17. A tonneau cover system for a vehicle having a cargo box, the tonneau cover system comprising:
a first side rail and a second side rail coupleable to opposite lateral sides of the cargo box, each one of the first side rail and the second side rail including a side rail retention member; and a roll-up tonneau cover sized and shaped to cover the cargo box and extend between the first side rail and the second side rail, the roll-up tonneau cover includes a plurality of slats coupled together that roll-up to give the roll-up cover a circular shape when rolled from a closed position to an open position, the roll-up tonneau cover having a first side proximate to the first side rail and a second side proximate to the second side rail, the first side of the roll-up tonneau cover and the second side of the roll-up tonneau cover each include at least one tonneau cover retention member;

wherein the side rail retention members cooperate with the roll-up tonneau cover retention members to maintain the first side and the second side of the roll-up tonneau cover in cooperation with the first side rail and the second side rail respectively, and thereby resist lifting of the first side from the first side rail and the second side from the second side rail; and wherein at least one of the side rail retention members of the first side rail and the second side rail extend discontinuously along at least a portion of the first side rail or the second side rail respectively.

* * * * *